United States Patent
Hsieh

(10) Patent No.: US 6,567,268 B1
(45) Date of Patent: May 20, 2003

(54) COOLING FAN WITH MAGNETIC LIQUID

(76) Inventor: Hsin-Mao Hsieh, No. 6, East Section, Chiao Nan Li, Industrial 6th Rd., Pingtung City, Pingtung Hsien (TW)

( * ) Notice: Subject to any disclaimer, the term of this patent is extended or adjusted under 35 U.S.C. 154(b) by 0 days.

(21) Appl. No.: 10/144,839

(22) Filed: May 15, 2002

(51) Int. Cl.[7] .................................................. H05K 7/20
(52) U.S. Cl. .................... 361/695; 361/69.7; 310/90; 417/423.13; 417/423.14
(58) Field of Search ................................. 361/390, 694, 361/695, 699; 257/721; 174/16.1, 16.3; 165/104.33, 122; 310/90, 91, 64; 417/423.13, 423.14

(56) References Cited

U.S. PATENT DOCUMENTS

| | | | | |
|---|---|---|---|---|
| 4,519,010 A | * | 5/1985 | Elsaesser et al. | 360/99.08 |
| 4,604,665 A | * | 8/1986 | Muller et al. | 360/97.02 |
| 4,629,919 A | * | 12/1986 | Merkle | 310/90 |
| 6,118,658 A | * | 9/2000 | Nakase | 361/697 |
| 6,236,129 B1 | * | 5/2001 | Yamashita | 310/90 |
| 6,394,768 B1 | * | 5/2002 | Fukuda et al. | 417/423.15 |

* cited by examiner

*Primary Examiner*—Boris Chervinsky
(74) *Attorney, Agent, or Firm*—Varndell & Varndell, PLLC

(57) ABSTRACT

A cooling fan has a housing with a chamber defined therein. The housing has a seat provided in the chamber, a sleeve made of non-magnetized material and formed on the seat, a self-lubricating bearing received in the sleeve, a magnetic ring provided at a top of the sleeve, and lubricant received between the bearing and the magnetic ring. A circuit board is provided on the seat and outside the sleeve. A coil is provided on the circuit board and outside the sleeve. A rotor is rotatably mounted on the sleeve. The rotor has a hollow body covering the coil and the circuit board. A spindle is formed at a center of the hollow body and extends through the magnetic ring and in the bearing. A gap is defined between the magnetic ring and the spindle. Magnetic liquid is received in the gap for preventing the lubricant from escaping.

11 Claims, 3 Drawing Sheets

COOLING FAN WITH MAGNETIC LIQUID

BACKGROUND OF THE INVENTION

1. Field of the Invention

The present invention is related to a cooling fan, and more particularly to a cooling fan with magnetic liquid to prevent lubricant in a bearing from escaping.

2. Description of Related Art

A conventional cooling fan for reducing a temperature of an electric element such as a CPU, generally has a self-lubricating bearing provided therein. The bearing has lubricant provided therein and oil-seals for preventing the lubricant from escaping the fan. However, after a term of time, lubricant will still leak out because the sealing effect of the oil-seals is not good. Thus, friction between the spindle and the self-lubricating bearing is high and a use life of the cooling fan is short.

Therefore, the invention provides an improved cooling fan to mitigate and/or obviate the aforementioned problems.

SUMMARY OF THE INVENTION

The main objective of the invention is to provide a cooling fan that has magnetic liquid provided therein for preventing lubricant in a bearing from escaping.

Other objects, advantages and novel features of the invention will become more apparent from the following detailed description when taken in conjunction with the accompanying drawings.

DETAILED DESCRIPTION OF THE PREFERRED EMBODIMENT

Figure 1:
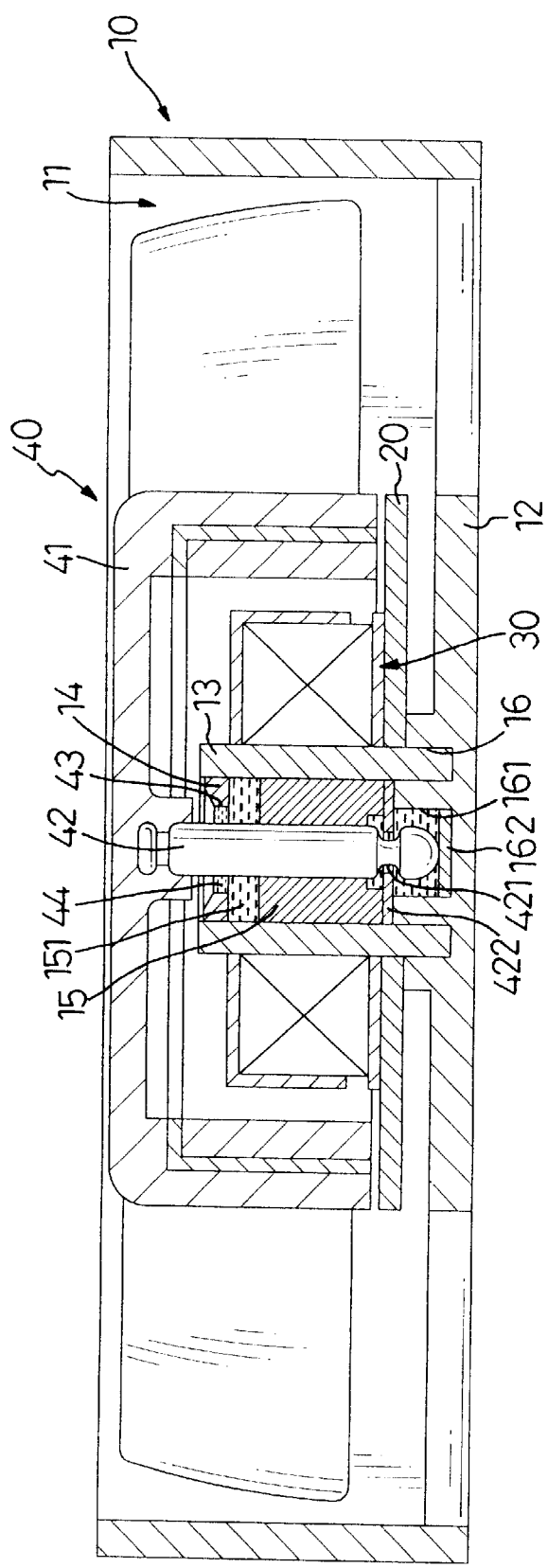
FIG. 1 is a sectional view of a cooling fan in accordance with the invention.

Referring to FIG. 1, a cooling fan with magnetic liquid in accordance with the invention has a housing (10) with a chamber (11) defined therein. A seat (12) is formed at a bottom of the chamber (11). A sleeve (13), made of non-magnetized material, is vertically provided on the seat (12). A self-lubricating bearing (15) is received in the sleeve (13) and a magnetic ring (14) is provided at a top of the bearing (15). Lubricant (151) is provided between the bearing (15) and the magnetic ring (14).

A circuit board (20) is provided on the seat (12) and outside the sleeve (13). A coil (30) is provided on the circuit board (20) and outside the sleeve (13).

A rotor (40) has a hollow body (41) mounted outside the sleeve (13). A spindle (42) is formed at a center of the hollow body (41) and extends through the magnetic ring (14) and in the bearing (15). A gap (43) is defined between the spindle (42) and the magnetic ring (14), and the gap (43) is filled with the magnetic liquid (44). The magnetic ring (14) attracts the magnetic liquid (44) which is used for lubricating the spindle (42) and preventing the lubricant (151) from escaping.

In the first embodiment shown in FIG. 1, the seat (12) has a ring recess (16) defined therein, and the sleeve (13) is detachably mounted in the ring recess (16). A central recess (161) is defined in a flange (not numbered) at the center of the seat (12) to receive a bottom end of the spindle (42). A pad (162) is received in the central recess (161) and abuts the bottom end of the spindle (42). The spindle (42) has a neck (421) that is defined adjacent the bottom end thereof, and a washer (422) is secured in the neck (421) and positioned on the flange of the seat (12).

Figure 2:
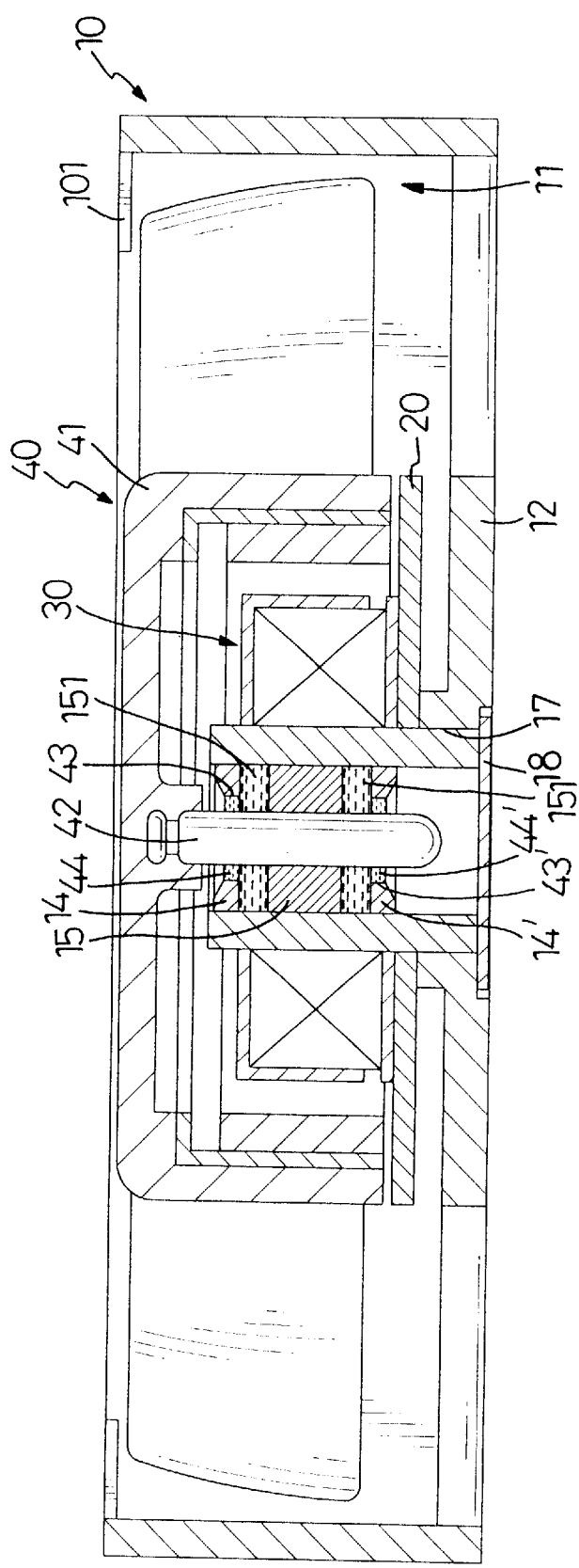
FIG. 2 is another sectional view of a second embodiment of the cooling fan in accordance with the invention.

Referring to FIG. 2, in a second embodiment of the invention, the seat (12) has an opening (17) defined through a bottom thereof. The sleeve (13) is received in the opening (17) and secured by an adhesive sheet (18) at the bottom of the seat (12). A second magnetic ring (14') is provided at a bottom of the bearing (15) and the magnetic liquid (44') is also provided in a second gap (43') between the spindle (42) and the second magnetic ring (14'). The lubricant (151) is also provided between the second magnetic ring (14') and the bearing (15), and is prevented by the magnetic liquid (44') in the second magnetic ring (14') from escaping.

The housing (10) further has at least one finger (101) formed on an inner wall thereof and extending inwards for preventing blades from escaping in an emergency.

Referring back to FIGS. 1 and 2, the gaps (43, 43') of the magnetic ring (14, 14') are tapered inwards to facilitate the magnetic liquid (44, 44') to adsorb in the gaps (43, 43').

Figure 3:
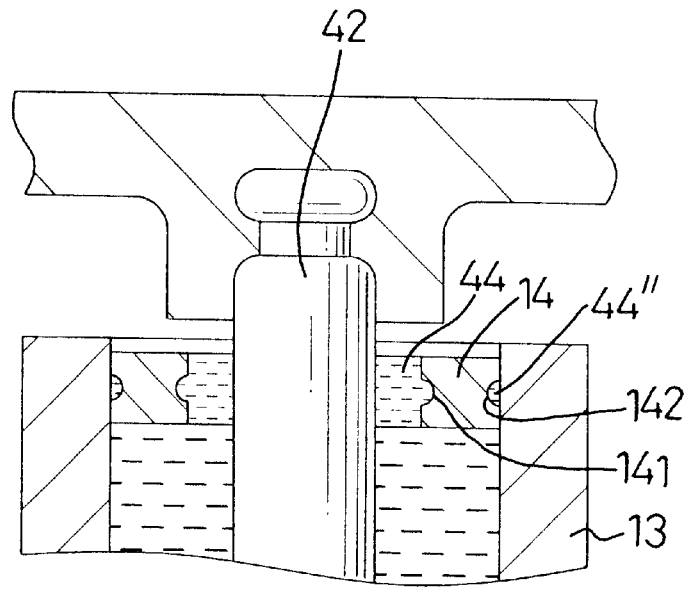
FIG. 3 is a partial sectional view of a magnetic ring mounted in the cooling fan.

Referring to FIG. 3, the magnetic ring (14a) can have a first ring channel (141) circumferentially defined in an inner wall thereof. A second ring channel (142) is circumferentially defined in an outer periphery of the magnetic ring (14) and magnetic liquid (44'') is received in the second ring channel (142).

Figure 4:
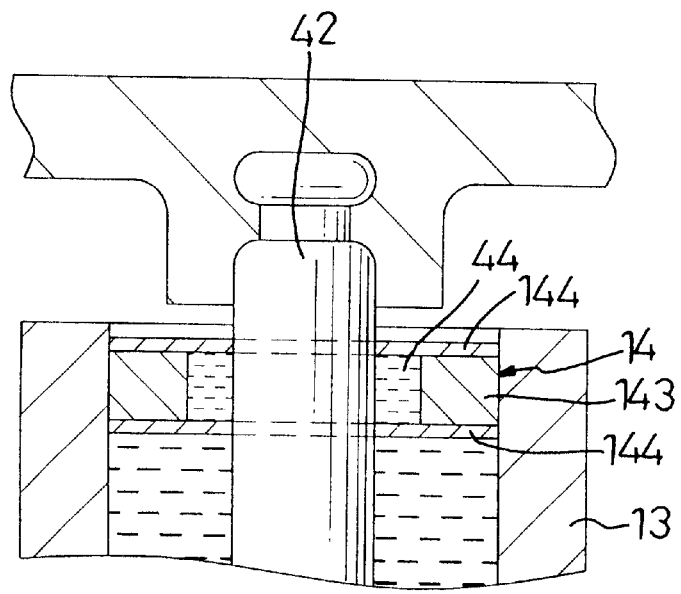
FIG. 4 is a partial sectional view of another type of magnetic ring used in the cooling fan.

Referring to FIG. 4, according to another embodiment of the invention, the magnetic ring (14b) can be composed of a ring magnet (143) and two magnetic sheets (144) respectively provided at a top and a bottom of the ring magnet (143). A diameter of a central opening of the magnetic sheets (144) is larger than a diameter of the spindle (42) but smaller than an inner diameter of the ring magnet (143). The magnetic liquid (44) is received between the spindle (42) and the ring magnet (143), and between the two magnetic sheets (144).

From the above description, it is noted that the invention has the following advantages:

1. By using the magnetic liquid, the lubricant in the bearing can be effectively prevented from escaping and external dust can not enter into the bearing, so that the spindle has a long term of use life.

2. Without oil seals or oil covers, friction between the spindle and the magnetic liquid is small, so that an efficiency of the cooling fan is high.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles, of the invention to the full extent indicated by the broad general meaning of the terms in which the appended claims are expressed.

What is claimed is:

1. A cooling fan with magnetic liquid, comprising:
   a housing (10) with a chamber (11) defined therein, the housing (10) having a seat (12) provided at a bottom of the chamber (11), a sleeve (13) which is made of non-magnetized material formed on the seat (12), a self-lubricating bearing (15) received in the sleeve (13), a magnetic ring (14) provided at a top of the sleeve (13), lubricant (151) received between the bearing (15) and the magnetic ring (14);

a circuit board (20) provided on the seat (20) and outside the sleeve (13);

a coil (30) provided on the circuit board (20) and outside the sleeve (13); and a rotor (40) rotatably mounted on the sleeve (13), the rotor (40) having a hollow body (41) covering the coil (30) and the circuit board (20), a spindle (42) formed at a center of the hollow body (41) and extending through the magnetic ring (14) and in the bearing (15), a gap (43) defined between the magnetic ring (14) and the spindle (42), magnetic liquid (44) received in the gap (43) for preventing the lubricant (151) from escaping from between the bearing (15) and the magnetic ring (14).

2. The cooling fan as claimed in claim 1, wherein the seat (12) has a flange formed at a center thereof and a ring recess (16) defined in the flange, the sleeve (13) is detachably mounted in the ring recess (16); and the spindle (42) has a neck (421) defined at a bottom end thereof and a collar (422) is provided on the flange and located in the neck (421) of the spindle (42).

3. The cooling fan as claimed in claim 2, wherein the seat (12) further has a central recess (161) defined at the center thereof, and a pad (162) received in the central recess (161); the bottom end of the spindle (42) is received in the central recess (161) and abuts the pad (162).

4. The cooling fan as claimed in claim 1 further comprising a second magnetic ring (14') provided at a bottom of the bearing (15), a second gap (43') defined between the spindle (42) and the second magnetic ring (14'), the lubricant (151) provided between the bearing (15) and the second magnetic ring (14'), and the magnetic liquid (44') received in the second gap (43') for preventing the lubricant (151) from escaping from between the bearing (15) and the second magnetic ring (14').

5. The cooling fan as claimed in claim 4, wherein the seat (12) has an opening (17) defined therethrough, the sleeve (13) is received in the opening (17) and secured by an adhesive sheet (18) provided at the bottom of the seat (12).

6. The cooling fan as claimed in claim 5, wherein the housing (10) further comprises at least one finger (101) provided on an inner wall thereof and extending inwards, and above the rotor (40).

7. The cooling fan as claimed in claim 1, wherein the gap (43) of the magnetic ring (14) is tapered inwards.

8. The cooling fan as claimed in claim 1, wherein the magnetic ring (14a) has a first ring channel (141) defined on an inner wall thereof.

9. The cooling fan as claimed in claim 1, wherein the magnetic ring (14a) has a second ring channel (142) defined on an outer periphery thereof.

10. The cooling fan as claimed in claim 1, wherein the magnetic ring (14b) is composed of a ring magnet (143) and two magnetic sheets (144) respectively provided on a top and a bottom of the ring magnet (143), and magnetic liquid is received between the spindle (42) and the ring magnet (143) and between the two magnetic sheets (144).

11. The cooling fan as claimed in claim 10, wherein a diameter of a central opening of the magnetic sheets (144) is larger than a diameter of the spindle (42) but smaller than an inner diameter of the ring magnet (143).

* * * * *